US007533295B2

(12) United States Patent
Gunda et al.

(10) Patent No.: US 7,533,295 B2
(45) Date of Patent: May 12, 2009

(54) TWO NODE VIRTUAL SHARED DISK CLUSTER RECOVERY

(75) Inventors: Kalyan C. Gunda, Poughkeepsie, NY (US); Brian D. Herr, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/772,293

(22) Filed: Jul. 2, 2007

(65) Prior Publication Data

US 2008/0016394 A1 Jan. 17, 2008

Related U.S. Application Data

(63) Continuation of application No. 10/652,509, filed on Aug. 29, 2003, now Pat. No. 7,302,607.

(51) Int. Cl.
  *G06F 11/00* (2006.01)
(52) U.S. Cl. .................... 714/10; 714/4; 714/9
(58) Field of Classification Search .............. 714/4, 714/9, 10
  See application file for complete search history.

(56) References Cited

U.S. PATENT DOCUMENTS

| 5,896,503 | A | 4/1999 | Badovinatz et al. .... 395/200.31 |
| 5,948,109 | A | 9/1999 | Moiin et al. .................. 714/4 |
| 6,151,688 | A | 11/2000 | Wipfel et al. ................. 714/48 |
| 6,192,401 | B1 | 2/2001 | Modiri et al. ............... 709/220 |

(Continued)

FOREIGN PATENT DOCUMENTS

JP  2000222373 A  8/2000

OTHER PUBLICATIONS

"System for Improving the Re-healing of Partitioned Clusters in Hierarchical Networks" IBM Research Disclosure 450156, Oct. 2001, p. 1804.

(Continued)

*Primary Examiner*—Michael C Maskulinski
(74) *Attorney, Agent, or Firm*—Geraldine D. Monteleone, Esq.; Lawrence D. Cutter, Esq.; Heslin Rothernberg Farley & Mesiti P.C.

(57) ABSTRACT

A method for recovery in a two-node data processing system is provided wherein each node is a primary server for a first nonvolatile storage device and for which there is provided shared access to a second nonvolatile storage device for which the other node is a primary server and wherein each node also includes a direct connection to the shared nonvolatile storage device for which the other node is the primary server. Upon notification of failure, the method operates by first confirming continued access by each node to the nonvolatile storage device for which it is the primary server and then by attempting to access the shared nonvolatile storage device via the direct connection and by waiting for a time sufficient for the same process to be carried out by the other node. If access to the shared nonvolatile storage device is successful, the node takes control of both nonvolatile storage devices. If the access is not successful a comparison of node numbers is carried out to decide the issue of control. Whenever a node determines that it does not have access to the storage device for which it is the primary server, it shuts down recovery at the node.

4 Claims, 1 Drawing Sheet

U.S. PATENT DOCUMENTS

| | | | |
|---|---|---|---|
| 6,363,495 | B1 | 3/2002 | MacKenzie et al. ............. 714/4 |
| 6,438,705 | B1 | 8/2002 | Chao et al. ...................... 714/4 |
| 6,442,713 | B1 | 8/2002 | Block et al. ................... 714/43 |
| 6,460,149 | B1 | 10/2002 | Rowlands et al. ............. 714/43 |
| 2002/0161869 | A1 | 10/2002 | Griffin et al. ................ 709/221 |
| 2003/0005350 | A1 | 1/2003 | Koning et al. ................... 714/4 |
| 2004/0158777 | A1 | 8/2004 | Bae et al. ...................... 714/47 |

OTHER PUBLICATIONS

Chang, et al., "Striped Checkpointing on Cluster Computer with Single IO Space" ISCA International Conference, 17th San Francisco, Apr. 4-6, 2002, pp. 364-367.

Gallard et al., "Dynamic Resource Management in a Cluster for High-Availability" Euro-Par 2002 Parallel Processing, International Euro-Par Conference, 8th, Paderborn, Germany, Aug. 27-30, 2002, pp. 589-592.

Lewis, P. "A High Availability Cluster for Linux" Aug. 1999.

Nishioka et al. "Consistent Checkpointing for High Performance Clusters" IEEE International Conference on Cluster Computing, Chemnitz, Germany, Nov. 28-Dec. 1, 2000. pp. 367-368.

Saito et al. "Manageability, Availability, and Performance in Porcupine: A Highly Scalable, Cluster-Based Mail Service" ACM Transactions on Computer Systems, vol. 18, No. 3, Aug. 2000, pp. 298-332.

Wu et al. "Parity-distribution: a Shortcut to Reliable Cluster Computing System" IEEE 2000 0-7695-0589-2/00, pp. 417-422.

TWO NODE VIRTUAL SHARED DISK CLUSTER RECOVERY

CROSS-REFERENCE TO RELATED APPLICATION

This application is a continuation of U.S. patent application Ser. No. 10/652,509, filed Aug. 29, 2003 now U.S. Pat. No. 7,302,607, and published Mar. 3, 2005 as U.S. Patent Publication No. US-2005-0050376-A1, entitled "Two Node Virtual Shared Disk Cluster Recovery", by Kaylan C. Gunda et al., the entirety of which is hereby incorporated herein by reference.

BACKGROUND OF THE INVENTION

The present invention is generally directed to multi-node data processing systems which share access to at least one disk storage unit, or other form of nonvolatile memory, such as a rotating optical medium. More particularly, the present invention is directed to multi-node data processing systems in which groups of processor nodes are established for the purpose of carrying out various tasks. Even more particularly, the present invention is directed to a method and system for providing nonconcurrent shared disk recovery in a two node data processing system when a quorum of nodes is not present.

The Recoverable Virtual Shared Disk (RVSD) product (marketed and sold by International Business Machines, Inc., the assignee of the present invention) provides nonconcurrent virtual shared disk access and recovery. As used herein, "nonconcurrent" means that disk access is not granted to the same disk simultaneously from two different nodes. The present invention is specifically directed to the situation in which two nodes are present. In such cases, one of the nodes is designated as the primary server for managing access to shared disks which contain data. When the primary disk server fails, the backup disk server automatically and transparently takes over control of disk access management thus allowing a shared disk application such as the IBM General Parallel File System (GPFS) to continue to run uninterrupted. The Recoverable Virtual Shared Disk product implements this recovery using Group Services, a component of the Reliable Scalable Cluster Technology (RSCT) present in the assignee's pSeries of data processing product, to monitor a group of networked nodes for node failure.

The quorum concept is employed in multi-node data processing systems to handle a network partition such as might occur as the result of a communication failure. In a data processing system having n nodes, a quorum sufficient for further system operation is typically set at n/2+1, so that in the case of a network partition, the node group that forms with the majority of nodes stays "up" and the other group is deactivated. This provides a consistent recovery state so that only one server attempts to takeover the shared disks. However, using the same quorum value and algorithm for a system having only two nodes, results in a quorum of two, which implies that either both nodes stay up or both nodes go down. This is not an acceptable choice. Thus, one can not in general use the quorum concept as part of a recovery method if there are only two nodes. Without a quorum, when there is a node failure notification in a two node system, one doesn't know if the other node has failed or if there has been a network partition.

This problem has been solved in the past by requiring a third node to act as a tiebreaker, but then you don't actually have a two-node system. The present invention avoids this and still does not require the use of a third node.

SUMMARY OF THE INVENTION

In accordance with a preferred embodiment of the present invention, a method for recovery is provided in a two-node data processing system in which each node is a primary server for its own disk drive and in which there is shared access to another disk for which the other node is a primary server. Each node also includes a direct hardware connection to the shared disk for which the other node is the primary server. The process begins with the receipt, at one of the nodes, of notification of communication failure with the other node. At this point it is anticipated that a similar process is operating on the other node which is also seeking to reestablish contact with the lost shared disk drive. Accordingly, it is next determined whether or not the (first) node has access to the disk for which it is the primary server, since it is possible that the other node may have assumed control of this disk via a second, direct communication path. If the node detects that it no longer has access to its own disk (the one for which it is the primary server) it shuts down its recovery process. However, if it still does have access to its own disk the (first) node then attempts to access the other disk (that is, the disk for which the other node is the primary server) via the direct communication path and waits for a period of time sufficient to assure that recovery processes at the other node have completed past the same point as at the subject (first) node. The subject node then determines if it still has access to its own disk. If it is determined that this access is still available, the subject node then assumes control of the other node's disk as well via the direct connection. The fact that disk access is still available means that the other node has probably failed and/or has at least not succeeded in taking control of the shared disk in the time allotted to it to do so. However, if the subject node does not have access to its own disk, a comparison of node numbers is made to break the deadlock and to thus decide which node controls both disks.

The present solution does not require the use of quorum methods and provides a method in which only one node persists in the event of a network partition. Moreover, it is noted that while the description herein focuses on the use of disk drives as the storage mechanism, any form of nonvolatile storage medium is equally easily employed, as long as there is a second, direct communication path provided to supplement the shared path. It is also to be noted that, while the description herein is couched in terms of a two-node data processing system, it is anticipated that that structure normally arises within the umbrella of a multinode system in which two nodes have been included as a working group in their own partition.

Accordingly, it is an object of the present invention to provide a method for recovery in a two-node multiprocessor system with shared memory.

It is an additional object of the present invention to increase the availability of processing operations in a two-node data processing system.

It is also an object of the present invention to increase the availability of shared storage in a two-node data processing system.

It is a still further object of the present invention to ameliorate the effects of node partitioning.

It is a still further object of the present invention to protect against the negative effects of communication adapter failure.

It is a yet another object of the present invention to protect against failure of one of the nodes in a two-node data processing system.

It is another object of the present invention to preserve data integrity and enhance data availability in multinode, shared access data processing systems.

Lastly, but not limited hereto, it is an object of the present invention to improve the reliability, flexibility and availability of multinode data processing systems.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawing in which:

DETAILED DESCRIPTION OF THE INVENTION

Figure 1:
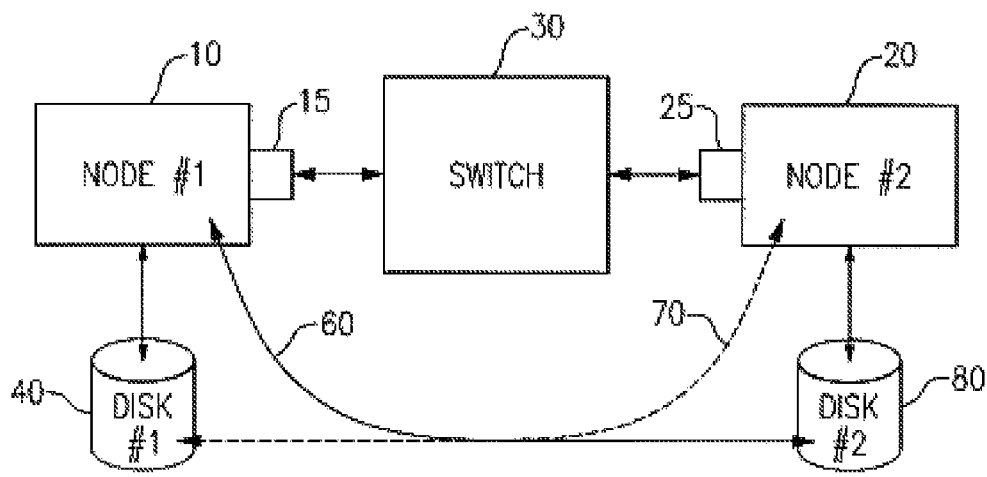
FIG. 1 is a block diagram illustrating the environment in which the present invention is employed.

The environment in which a preferred embodiment of the present invention operates is illustrated in FIG. 1. In particular, the environment includes two independent nodes 10 and 20 (also referred to herein as Node #1 and Node #2). Each of these nodes includes a communications adapter, 15 and 25, for nodes 10 and 20, respectively, which connects the individual nodes optionally through a connection such as switch 30, as shown. In applicants' preferred embodiment, the system environment shown in FIG. 1 is one that would exist in a pSeries product as marketed and sold by the assignee of the present invention. In normal operation, each node operates as the server for a disk storage unit (disk 40 for node 10 and disk 80 for node 20). In general, disk 40 or disk 80 represents on or more individual disks. Furthermore, disks 40 and 80 actually represent any form of nonvolatile storage device or system which is connected to one node directly as its controlling server node and to another node through a direct path which is not normally used for disk control or access. In particular, node 10 is also connected via such a route through link 60 to disk 80. Likewise, node 20 is connected via such a route through link 70 to disk 40.

Figure 2:
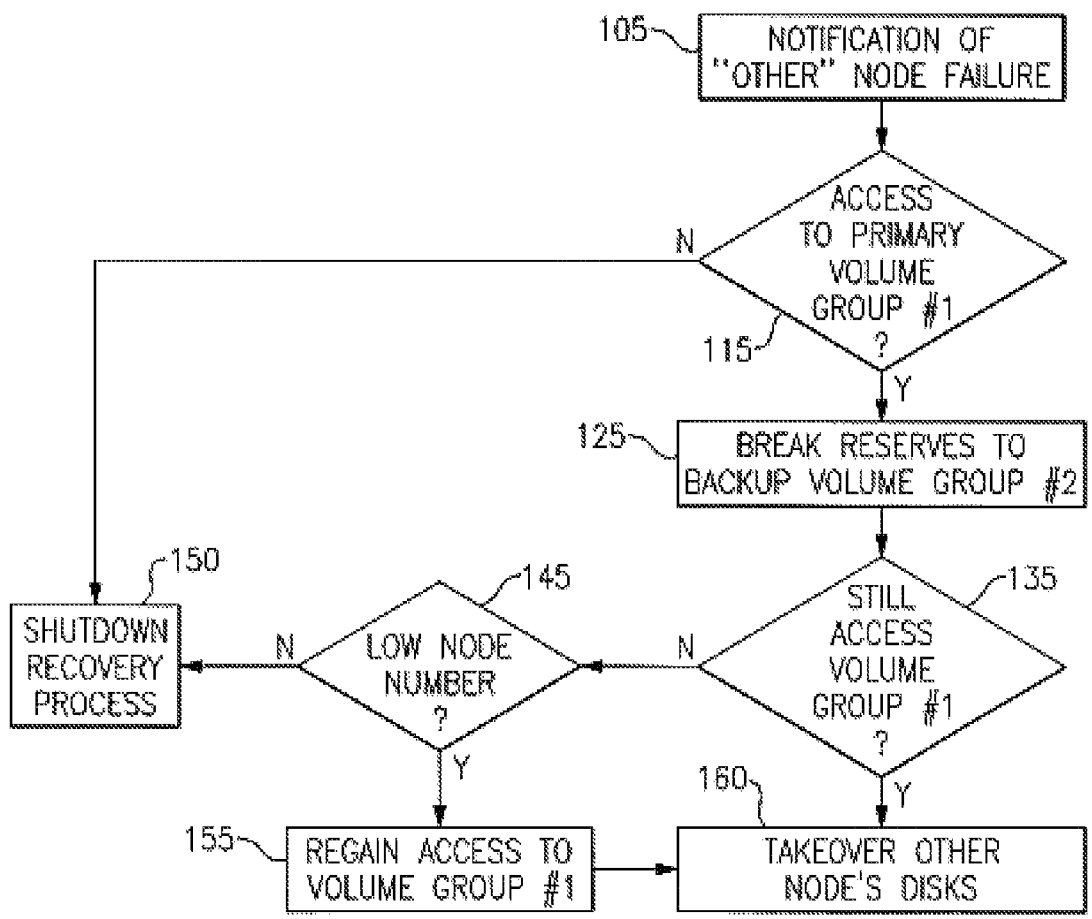
FIG. 2 is a logic flow diagram illustrating the steps carried out in the method of the present invention.

The present solution uses two disks and their disk access to decide which node stays up given a node failure notification. The present method operates in a data processing environment having two nonconcurrent disk volume groups in a "cross-cabled" configuration such that each node is the primary server for a volume group and is also a backup server for a different volume group. Cross cabling provides a direct hardware connection between each of the two nodes and the disk for which it is not the primary server. The algorithm of the present invention involves breaking reserves (that is, breaking SCSI reserves in the preferred embodiment) to the disk and then checking to see if the node still has access to the disk. As used herein the term "breaking reserves" refers to the process in which the reservation of exclusive access to a disk is broken (that is, removed). This solution provides reliable disk recovery for a two-node system ensuring that only one node accesses the disks. A flow chart illustrating the method described below is provided in FIG. 2.

When a network partition occurs, each node is notified that the other node might be down (see step 105 in FIG. 2), at which time each node takes the following steps to determine which node survives. A "wait time," WT, is defined so as to be approximately equal to:

(process swap time+CPU time slice+time taken to break reservation)*2

It is noted, however, that this value is only approximate; it may be otherwise estimated beforehand using approximate values for any of the three components identified above; its exact value is not critical. Generally, this value is selected so as to ensure that, if the other node runs steps 115 and 125 (see FIG. 2) before this point in the process, then it would have completed step 125 before step 135 is carried out. As part of this timing process, each node also takes an initial time stamp (Timestamp1). Each node selects the first disk (Disk #1), for which the local node is primary and for which the other node (the partner node) is secondary. Each node selects another disk (Disk #2), for which the local node is secondary and for which the partner node is primary. A check is made to see if the node (that is, the local node) has access to Disk #1 (see step 115). If it does not have access to its primary disk, it shuts down its recovery process (see step 150). If it does have access to Disk #1, a second time stamp is taken (Timestamp2), if (Timestamp2−Timestamp1)$^3$ WT, then the node shuts down it's recovery process. Otherwise, the method proceeds to break the reservation to Disk #2 (see step 125). A third time stamp is taken (Timestamp3), if (Timestamp3−Timestamp1)$^3$ WT, then it shuts down it's recovery process. Each node now waits the wait time (WT) to ensure that Steps 115 and 125 have completed on the other node if it was still up and running the same or similar recovery protocol.

Next, each node checks to see if the local node still has access to Disk #1 (its primary disk; see step 135). If it does, then the method proceed to step 160 where the node breaks reserve and accesses the other node's disks. If it does not have access to Disk #1, then each node compares its node_number with its partner_node_number (see step 145). The arrival at this juncture in the process at step 145 means that both nodes are running the present algorithm around the same time. If my node_number<partner node_number then the method proceeds to step 155 where, if the local node does not already have access to Disk #2, it breaks reserve again to get access to the other node's disks (see step 160). However, if it is not the case that my node_number<partner node_number then the node shuts down its recovery process (see step 150). It is noted that the comparison could be carried out in the reverse sense, just as long as it is done so consistently over time.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for recovery in a two-node data processing system wherein each node is a primary server for a first disk drive and for which there is provided shared access to a second disk for which the other node is a primary server and wherein each node also includes a direct connection to the shared disk for which the other node is the primary server, said method comprising the steps of:

upon notification of failure, confirming continued access by each node to the disk for which it is the primary server and accessing said shared disk via said direct connection and waiting for a time sufficient for the same process to be carried out by the other node, and if access to said shared disk is not successful, comparing node numbers to determine which node takes control of both disks.

2. The method of claim 1 further including the step of shutting down recovery at a node for which it is determined that access to the disk for which the node is the primary server is denied.

3. The method of claim 1 further including a step of taking control of said shared disk in the case that access to said shared disk is successful.

4. A method for recovery in a two-node data processing system wherein each node is a primary server for a first nonvolatile storage device and for which there is provided shared access to a second nonvolatile storage device for which the other node is a primary server and wherein each node also includes a direct connection to the shared nonvolatile storage device for which the other node is the primary server, said method comprising the steps of:

upon notification of failure, confirming continued access by each node to the nonvolatile storage device for which it is the primary server and accessing said shared nonvolatile storage device via said direct connection and waiting for a time sufficient for the same process to be carried out by the other node, and if access to said shared nonvolatile storage device is not successful, comparing node numbers to determine which node takes control of both nonvolatile storage devices.

* * * * *